US012046104B2

(12) United States Patent
Taylor et al.

(10) Patent No.: US 12,046,104 B2
(45) Date of Patent: *Jul. 23, 2024

(54) PROGRESSIVE SYSTEMS ON A DISTRIBUTED LEDGER

(71) Applicant: Aristocrat Technologies, Inc., Las Vegas, NV (US)

(72) Inventors: Eric Taylor, Carson City, NV (US); Nimish Purohit, Las Vegas, NV (US); Thomas Rizos, Austin, TX (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/844,466

(22) Filed: Jun. 20, 2022

(65) Prior Publication Data

US 2022/0327893 A1  Oct. 13, 2022

Related U.S. Application Data

(63) Continuation of application No. 16/841,957, filed on Apr. 7, 2020, now Pat. No. 11,373,480.
(Continued)

(51) Int. Cl.
*G07F 17/32* (2006.01)
*H04L 9/00* (2022.01)
(Continued)

(52) U.S. Cl.
CPC ...... *G07F 17/3258* (2013.01); *G07F 17/3225* (2013.01); *H04L 9/0643* (2013.01);
(Continued)

(58) Field of Classification Search
CPC ............ G07F 17/3258; G07F 17/3225; H04L 9/0643; H04L 9/3297; H04L 9/50; H04L 2209/56; H04L 9/3239
See application file for complete search history.

(56) References Cited

U.S. PATENT DOCUMENTS 6,383,076 B1   5/2002  Tiedeken
7,003,139 B2   2/2006  Endrikhovski
(Continued)

FOREIGN PATENT DOCUMENTS

AU   2019203135 A1   12/2019
GB      2573622         4/2019
(Continued)

OTHER PUBLICATIONS

Office Action (Notice of Allowance and Fees Due (PTOL-85)) dated Jan. 5, 2023 for U.S. Appl. No. 17/222,763 (pp. 1-7).
(Continued)

*Primary Examiner* — Ronald Laneau
(74) *Attorney, Agent, or Firm* — Armstrong Teasdale LLP

(57) ABSTRACT

A blockchain system provides progressive jackpots within a blockchain network of participating electronic devices. The blockchain system includes an electronic gaming machine storing a local blockchain and a system blockchain. The EGM is configured to identify a plurality of transactions for the first progressive jackpot account, each transaction of the plurality of transactions are deposit transactions from the first plurality of electronic gaming devices adding value to the first progressive jackpot account within the local blockchain. The EGM also determines a total sum amount of the plurality of transactions and creates a first deposit blockchain transaction including a first progressive jackpot account identifier and the total sum amount. The EGM transmits the first deposit blockchain transaction to one or more nodes of the second plurality of electronic gaming devices for addition to the system blockchain.

20 Claims, 7 Drawing Sheets

Related U.S. Application Data

(60) Provisional application No. 62/855,439, filed on May 31, 2019.

(51) Int. Cl.
   *H04L 9/06* (2006.01)
   *H04L 9/32* (2006.01)

(52) U.S. Cl.
   CPC .............. *H04L 9/3297* (2013.01); *H04L 9/50* (2022.05); *H04L 2209/56* (2013.01)

(56) References Cited

U.S. PATENT DOCUMENTS

| | | |
|---|---|---|
| 7,168,089 B2 | 1/2007 | Nguyen |
| 7,316,615 B2 | 1/2008 | Soltys |
| 7,708,638 B2 | 5/2010 | Enzminger |
| 7,951,003 B2 | 5/2011 | Russell |
| 8,157,647 B2 | 4/2012 | House |
| 8,303,417 B2 | 11/2012 | Burke |
| 8,449,378 B2 | 5/2013 | Michaelson |
| 8,608,568 B2 | 12/2013 | Carpenter |
| 8,777,758 B2 | 7/2014 | Anderson |
| 8,801,517 B2 | 8/2014 | Walker |
| 8,917,971 B2 | 12/2014 | Woods |
| 8,974,304 B2 | 3/2015 | Gagner |
| 9,033,791 B2 | 5/2015 | Hamlin |
| 9,084,937 B2 | 7/2015 | Gadher |
| 9,117,329 B2 | 8/2015 | Osgood |
| 9,117,339 B2 | 8/2015 | Burke |
| 9,269,216 B2 | 2/2016 | Keilwert |
| 9,367,991 B2 | 6/2016 | Acres |
| 9,865,139 B2 | 1/2018 | Walker |
| 10,037,648 B2 | 7/2018 | Acres |
| 10,223,679 B2 | 3/2019 | Lee |
| 10,229,561 B2 | 3/2019 | Cage |
| 10,275,583 B2 | 4/2019 | Leuthardt |
| 10,297,106 B1 | 5/2019 | Simons |
| 10,322,727 B1 | 6/2019 | Chan |
| 10,425,426 B1 | 9/2019 | Simons |
| 10,530,569 B2 | 1/2020 | Bisti |
| 10,549,202 B2 | 2/2020 | McCoy |
| 10,741,017 B2 | 8/2020 | Silva |
| 10,850,204 B2 | 12/2020 | Bruzzo |
| 10,943,438 B2 | 3/2021 | Cage |
| 10,949,417 B2 | 3/2021 | Kurian |
| 10,950,081 B2 | 3/2021 | Baker |
| 11,023,981 B2 | 6/2021 | Hu |
| 11,045,726 B2 | 6/2021 | Hennessy |
| 11,107,321 B2 | 8/2021 | Ovalle |
| 11,158,170 B2 | 10/2021 | Thomas |
| 11,159,334 B2 | 10/2021 | Kuzma |
| 11,159,945 B2 | 10/2021 | Obaidi |
| 11,195,371 B2 | 12/2021 | Purohit |
| 11,232,442 B2 * | 1/2022 | Liu .................... H04L 63/0435 |
| 11,308,761 B2 | 4/2022 | Purohit |
| 11,373,446 B1 | 6/2022 | Beisel |
| 11,373,480 B2 | 6/2022 | Taylor |
| 2001/0019966 A1 | 9/2001 | Idaka |
| 2002/0025850 A1 | 2/2002 | Hafezi |
| 2002/0142831 A1 | 10/2002 | Mattice |
| 2002/0152120 A1 | 10/2002 | Howington |
| 2003/0032485 A1 | 2/2003 | Cockerille |
| 2003/0060283 A1 | 3/2003 | Rowe |
| 2004/0048669 A1 | 3/2004 | Rowe |
| 2004/0235562 A1 | 11/2004 | Kiely |
| 2005/0043086 A1 | 2/2005 | Schneider |
| 2006/0035713 A1 | 2/2006 | Cockerille |
| 2006/0063595 A1 | 3/2006 | Kondo |
| 2006/0166732 A1 | 7/2006 | Lechner |
| 2006/0205488 A1 | 9/2006 | Gagner |
| 2006/0264253 A1 | 11/2006 | Trobia |
| 2008/0058059 A1 | 3/2008 | Fitzsimons |
| 2008/0235746 A1 | 9/2008 | Peters |
| 2009/0042640 A1 | 2/2009 | Gagner |
| 2009/0197660 A1 | 8/2009 | Cramer |
| 2009/0247293 A1 | 10/2009 | Lenger |
| 2010/0203961 A1 | 8/2010 | Burke |
| 2010/0234094 A1 | 9/2010 | Gagner |
| 2010/0248812 A1 | 9/2010 | Pacey |
| 2010/0255902 A1 | 10/2010 | Goldstein |
| 2010/0291994 A1 | 11/2010 | Denham |
| 2011/0102546 A1 | 5/2011 | Dhuse |
| 2011/0111838 A1 | 5/2011 | Bauer |
| 2011/0124405 A1 | 5/2011 | Okada |
| 2012/0028703 A1 | 2/2012 | Anderson |
| 2012/0035751 A1 | 2/2012 | Dimitriadis |
| 2013/0072304 A1 | 3/2013 | Brosnan |
| 2013/0084959 A1 | 4/2013 | Nelson |
| 2013/0084960 A1 | 4/2013 | Frady |
| 2013/0084973 A1 | 4/2013 | Frady |
| 2013/0085001 A1 | 4/2013 | Anderson |
| 2013/0137498 A1 | 5/2013 | Willyard |
| 2013/0190095 A1 | 7/2013 | Gadher |
| 2013/0196755 A1 | 8/2013 | Nelson |
| 2014/0235324 A1 | 8/2014 | Ryan |
| 2014/0256450 A1 | 9/2014 | Bleich |
| 2014/0323194 A1 | 10/2014 | Keilwert |
| 2014/0324749 A1 | 10/2014 | Peters |
| 2015/0279155 A1 | 10/2015 | Chun |
| 2016/0012465 A1 | 1/2016 | Sharp |
| 2016/0023116 A1 | 1/2016 | Wire |
| 2016/0292558 A1 | 10/2016 | Vienneau |
| 2016/0335840 A1 | 11/2016 | Acres |
| 2017/0061731 A1 | 3/2017 | Colvin |
| 2017/0161991 A1 | 6/2017 | Ayati |
| 2017/0287593 A1 | 10/2017 | Ovalle |
| 2017/0293669 A1 | 10/2017 | Madhavan |
| 2017/0300876 A1 | 10/2017 | Musiala, Jr. |
| 2017/0316644 A1 | 11/2017 | Arnone |
| 2018/0019867 A1 | 1/2018 | Davis |
| 2018/0096175 A1 | 4/2018 | Schmeling |
| 2018/0096752 A1 | 4/2018 | Ovalle |
| 2018/0114403 A1 | 4/2018 | Jayachandran |
| 2019/0028264 A1 | 1/2019 | Bisti |
| 2019/0028265 A1 | 1/2019 | Bisti |
| 2019/0066488 A1 | 2/2019 | Locke |
| 2019/0096170 A1 | 3/2019 | Lewis |
| 2019/0096191 A1 | 3/2019 | Stuehling |
| 2019/0102986 A1 | 4/2019 | Nelson |
| 2019/0122300 A1 | 4/2019 | O'Brien |
| 2019/0122492 A1 | 4/2019 | Nguyen |
| 2019/0122495 A1 | 4/2019 | Yi |
| 2019/0130698 A1 | 5/2019 | Simons |
| 2019/0130701 A1 | 5/2019 | Simons |
| 2019/0143207 A1 | 5/2019 | Kumar |
| 2019/0163672 A1 | 5/2019 | Shmueli |
| 2019/0180558 A1 | 6/2019 | Merati |
| 2019/0188653 A1 | 6/2019 | Khaund |
| 2019/0205894 A1 | 7/2019 | Gonzales, Jr. |
| 2019/0221076 A1 | 7/2019 | Simons |
| 2019/0280875 A1 | 9/2019 | Ragnoni |
| 2019/0289019 A1 | 9/2019 | Thekadath |
| 2019/0295371 A1 | 9/2019 | Simons |
| 2019/0296915 A1 | 9/2019 | Lancashire |
| 2019/0314726 A1 | 10/2019 | Masini |
| 2019/0321722 A1 | 10/2019 | Hennessy |
| 2019/0325700 A1 | 10/2019 | Jayachandran |
| 2019/0333285 A1 | 10/2019 | Delia |
| 2019/0352125 A1 | 11/2019 | Wooten |
| 2019/0355209 A1 | 11/2019 | Sorey |
| 2019/0373015 A1 | 12/2019 | Kozloski |
| 2020/0021600 A1 | 1/2020 | Simons |
| 2020/0027315 A1 | 1/2020 | Cotton |
| 2020/0051368 A1 | 2/2020 | Pustizzi |
| 2020/0066093 A1 | 2/2020 | Schwartz |
| 2020/0090463 A1 | 3/2020 | Mohrhardt |
| 2020/0097862 A1 | 3/2020 | Arora |
| 2020/0105096 A1 | 4/2020 | Ovalle |
| 2020/0110855 A1 | 4/2020 | Cunningham |
| 2020/0152005 A1 | 5/2020 | Higgins |
| 2020/0168036 A1 | 5/2020 | Schwartz |
| 2020/0168038 A1 | 5/2020 | Schwartz |
| 2020/0193764 A1 | 6/2020 | Ovalle |

(56) References Cited

U.S. PATENT DOCUMENTS

| | | | |
|---|---|---|---|
| 2020/0211325 A1 | 7/2020 | Kaizerman | |
| 2020/0380817 A1 | 12/2020 | Purohit | |
| 2021/0037013 A1 | 2/2021 | Salkintzis | |
| 2021/0174634 A1 | 6/2021 | Purohit | |
| 2021/0233351 A1 | 7/2021 | Meltzer | |
| 2021/0327208 A1 | 10/2021 | Colvin | |
| 2021/0335085 A1 | 10/2021 | Froy, Jr. | |
| 2021/0350659 A1* | 11/2021 | Purohit | G07F 17/3223 |
| 2022/0006831 A1 | 1/2022 | Garg | |
| 2022/0030000 A1* | 1/2022 | Lee | G06Q 10/06315 |
| 2023/0130583 A1* | 4/2023 | Shaffer, Jr. | G07F 17/3241 463/26 |
| 2023/0306816 A1* | 9/2023 | Purohit | G06F 16/27 463/25 |

FOREIGN PATENT DOCUMENTS

| | | |
|---|---|---|
| WO | 2019089774 A1 | 5/2019 |
| WO | 2019089778 A1 | 5/2019 |

OTHER PUBLICATIONS

Office Action (Non-Final Rejection) dated Jan. 18, 2023 for U.S. Appl. No. 17/671,388 (pp. 1-6).
Office Action (Notice of Allowance and Fees Due (PTOL-85)) dated Feb. 10, 2023 for U.S. Appl. No. 17/721,152 (pp. 1-10).
Office Action (Non-Final Rejection) dated Mar. 16, 2023 for U.S. Appl. No. 17/529,050 (pp. 1-13).
Office Action (Non-Final Rejection) dated Mar. 16, 2023 for U.S. Appl. No. 17/529,069 (pp. 1-13).
Office Action (Non-Final Rejection) dated Apr. 12, 2023 for U.S. Appl. No. 17/543,339 (pp. 1-5).
Office Action (Notice of Allowance and Fees Due (PTOL-85)) dated Apr. 14, 2023 for U.S. Appl. No. 17/529,069 (pp. 1-9).
Notice of Allowance dated Apr. 14, 2023 for U.S. Appl. No. 17/529,050 (pp. 1-9).
Office Action (Notice of Allowance and Fees Due (PTOL-85)) dated Apr. 26, 2023 for U.S. Appl. No. 17/671,388 (pp. 1-9).
Office Action (Notice of Allowance and Fees Due (PTOL-85)) dated May 10, 2023 for U.S. Appl. No. 17/543,339 (pp. 1-5).
Office Action (Notice of Allowance and Fees Due (PTOL-85)) dated Jun. 7, 2023 for U.S. Appl. No. 17/697,637 (pp. 1-9).
Brendan Koerner, "Russians Engineer A Brilliant Slot Machine Cheat—And Casinos Have No Fix", https://www.wired.com/2017/02/russians-engineer-brilliant-slot-machine-cheat-casinos-no-fix/, Nov. 6, 2018, 14 pages.
Brendan Koerner, "Meet Alex, The Russian Casino Hacker Who Makes Millions Targeting Slot Machines", https://Wired.com/story/meet-alex-the-russian-casino-hacker-who-makes-millions-targeting-slot-machines/, Nov. 6, 2018, 18 pages.
Office Action dated Mar. 8, 2021 for U.S. Appl. No. 16/415,654 (pp. 1-12).
Office Action (Notice of Allowance and Fees Due (PTOL-85)) dated Nov. 26, 2021 for U.S. Appl. No. 16/778,743 (pp. 1-9).
Office Action (Notice of Allowance and Fees Due (PTOL-85)) dated Aug. 25, 2021 for U.S. Appl. No. 16/415,654 (pp. 1-10).
Office Action (Notice of Allowance and Fees Due (PTOL-85)) dated Oct. 6, 2021 for U.S. Appl. No. 16/864,800 (pp. 1-9).
Office Action (Notice of Allowance and Fees Due (PTOL-85)) dated Dec. 8, 2021 for U.S. Appl. No. 16/778,768 (pp. 1-8).
Office Action (Notice of Allowance and Fees Due (PTOL-85)) dated Dec. 21, 2021 for U.S. Appl. No. 16/837,655 (pp. 1-8).
Office Action (Notice of Allowance and Fees Due (PTOL-85) dated Dec. 23, 2021 for U.S. Appl. No. 16/778,841 (pp. 1-9).
Office Action (Notice of Allowance and Fees Due (PTOL-85)) dated Feb. 8, 2022 for U.S. Appl. No. 16/778,987 (pp. 1-8).
Office Action (Notice of Allowance and Fees Due (PTOL-85)) dated Jan. 13, 2022 for U.S. Appl. No. 16/864,800 (pp. 1-7).
Office Action (Notice of Allowance and Fees Due (PTOL-85)) dated Jan. 14, 2022 for U.S. Appl. No. 16/778,923 (pp. 1-8).
Office Action (Notice of Allowance and Fees Due (PTOL-85) dated Aug. 11, 2021 for U.S. Appl. No. 16/902,186 (pp. 1-8).
Office Action (Notice of Allowance and Fees Due (PTOL-85)) dated Feb. 2, 2022 for U.S. Appl. No. 16/778,889 (pp. 1-8).
Office Action (Non-Final Rejection) dated Feb. 1, 2022 for U.S. Appl. No. 17/222,763 (pp. 1-9).
Office Action (Notice of Allowance and Fees Due (PTOL-85)) dated Mar. 9, 2022 for U.S. Appl. No. 16/841,957 (pp. 1-9).
Office Action (Final Rejection) dated May 13, 2022 for U.S. Appl. No. 17/222,763 (pp. 1-11).
Office Action (Non-Final Rejection) dated Aug. 30, 2022 for U.S. Appl. No. 17/222,763 (pp. 1-11).
Australian Examination Report No. 1 issued in App. No. AU2019219795, dated Oct. 16, 2023, 4 pages.

* cited by examiner

PROGRESSIVE SYSTEMS ON A DISTRIBUTED LEDGER

CROSS-REFERENCE TO RELATED APPLICATION

This patent application is a continuation of, and claims the benefit priority of, U.S. patent application Ser. No. 16/841,957, filed Apr. 7, 2020, entitled PROGRESSIVE SYSTEMS ON A DISTRIBUTED LEDGER, which claims priority to U.S. Provisional Patent Application Ser. No. 62/855,439, filed May 31, 2019, entitled PROGRESSIVE SYSTEMS ON A DISTRIBUTED LEDGER, the entire contents and disclosure of which is hereby incorporated by reference in its entirety.

TECHNICAL FIELD

The field of disclosure relates generally to electronic gaming, and more particularly to electronic gaming systems and methods for providing progressive jackpots using blockchain technology.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player via a printed "ticket" upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

Some known EGMs provide progressive jackpots ("progressives"). With progressive jackpots, the EGM typically contributes a particular amount for each game round (e.g., a predetermined amount per wager, a percentage of each wager). These small amounts are added to the progressive, accumulating over time as a jackpot available to be won by the player. The current value of the progressive is typically displayed on a progressive jackpot meter at or near the EGM to inform nearby players of the current size of the jackpot. The EGMs typically have a pre-defined win condition that will trigger the player to win the progressive jackpot (e.g., 5 special symbols on a slot machine, royal flush on a poker machine, or such). When the player triggers a win for the progressive jackpot, the player is paid the current total and the progressive is typically reset to a base amount, allowing the progressive to begin increasing again.

Some progressives are local to a single EGM (referred to herein as "stand-alone progressives"). Other progressives may be pooled between multiple EGMs (referred to herein as "linked progressives"). With such linked progressives, the participating EGMs similarly collect small amounts per play. Those small amounts are added to a linked progressive jackpot, and that linked progressive jackpot is available to be won on any of the participating EGMs. Typically, a central progressive system server is provided as a central accounting device which tracks contributions from each of the participating EGMs, providing jackpot total amounts to each of the EGMs (e.g., for display locally on their own progressive jackpot meters), auditing win events, and conducting progressive resets upon a confirmed win event. Since multiple EGMs are contributing to the same linked progressive, these progressives typically rise faster and may be won more frequently. However, such linked progressives are traditionally supported by special hardware installed within each EGM (e.g., a progressive controller), as well as a central server system that communicates with each of the progressive controllers (e.g., the progressive system server). Such additional hardware provides additional cost to an EGM device and typically requires regular regulatory auditing to ensure compliance with local laws and may present security vulnerabilities or reliability exposures to operators.

BRIEF SUMMARY

In one aspect, a blockchain system for providing progressive jackpots within a blockchain network of participating electronic devices is provided. The blockchain system includes an electronic gaming machine configured to participate in the blockchain network. The electronic gaming machine includes a memory storing a local blockchain and a system blockchain. The local blockchain supports a first plurality of electronic gaming devices of the blockchain network. The system blockchain supports a second plurality of electronic gaming devices of the blockchain network. A first progressive jackpot is associated with a first progressive jackpot account defined within the local blockchain and the system blockchain. The electronic gaming machine also includes at least one processor configured to execute instructions which, when executed, cause the at least one processor to identify a plurality of transactions for the first progressive jackpot account. Each transaction of the plurality of transactions are deposit transactions from the first plurality of electronic gaming devices adding value to the first progressive jackpot account within the local blockchain. The instructions also cause the at least one processor to determine a total sum amount of the plurality of transactions. The instructions further cause the at least one processor to create a first deposit blockchain transaction including at least (1) a first progressive jackpot account identifier (ID) associated with the first progressive jackpot account in the system blockchain and (2) the total sum amount. The instructions also cause the at least one processor to transmit the first deposit blockchain transaction to one or more nodes of the second plurality of electronic gaming devices for addition to the system blockchain.

In another aspect, a computer-implemented method for providing a progressive jackpot within a blockchain network of participating electronic devices sharing a blockchain is provided. The method is performed by an electronic gaming machine participating as a node in the blockchain network. The blockchain is a distributed ledger managing one or more progressive jackpots offered by a plurality of electronic gaming devices in the blockchain network. The method includes receiving, at the electronic gaming machine, a wager for a round of play of an electronic game. The electronic gaming machine participates in a first progressive jackpot. The method also includes determining an increment amount based on an amount of the wager. The increment amount is a portion of the wager designated by the electronic gaming machine to be a contribution to the first progressive jackpot. The method further includes identifying a jackpot account identifier (ID) assigned to the first progressive jackpot. The method also includes creating a deposit blockchain transaction including at least (1) the jackpot account ID and (2) the increment amount. The method further includes transmitting the deposit blockchain transaction to one or more nodes of the blockchain network for addition to the blockchain.

In yet another aspect, a computer-implemented method for providing a progressive jackpot within a peer-to-peer blockchain network of participating electronic devices sharing a blockchain is provided. The method is performed by an electronic gaming machine participating as a node in the peer-to-peer network. The blockchain is a distributed ledger managing one or more progressive jackpots offered by a plurality of electronic gaming devices in the peer-to-peer network. The method includes determining, at the electronic gaming machine, a game outcome for a round of play of an electronic game that includes a jackpot win of a first progressive jackpot. The method also includes capturing a current win timestamp identifying a time of the jackpot win. The method further includes identifying a jackpot account ID of the first progressive jackpot. The method also includes determining a total jackpot value of the first progressive jackpot. The method further includes creating a first blockchain transaction including at least (1) the jackpot account ID and (2) the total jackpot value. The method also includes transmitting the first blockchain transaction to one or more nodes of the peer-to-peer blockchain network for addition to the blockchain.

In still another aspect, a system of electronic devices participating in a peer-to-peer blockchain network sharing a blockchain is provided. The blockchain is a distributed ledger tracking transactions associated with at least one progressive jackpot. The system includes a plurality of participating devices participating in a first progressive jackpot of the at least one progressive jackpot. The plurality of participating devices is configured to determine increment amounts for each round of play of an electronic game, create deposit transactions for each round of play of the electronic game, and transmit the deposit transactions to the peer-to-peer network for addition to the blockchain. The system also includes a first device of the plurality of participating devices. The first device is configured to determine a game outcome of an electronic game that includes a jackpot win of the first progressive jackpot, identify a total jackpot value of the first progressive jackpot, and transmit a withdrawal transaction to the peer-to-peer blockchain network for addition to the blockchain, thereby decreasing a jackpot account associated with the first progressive jackpot by the total jackpot value.

BRIEF DESCRIPTION OF THE DRAWINGS

An example embodiment of the subject matter disclosed will now be described with reference to the accompanying drawings.

DETAILED DESCRIPTION

Figure 1:
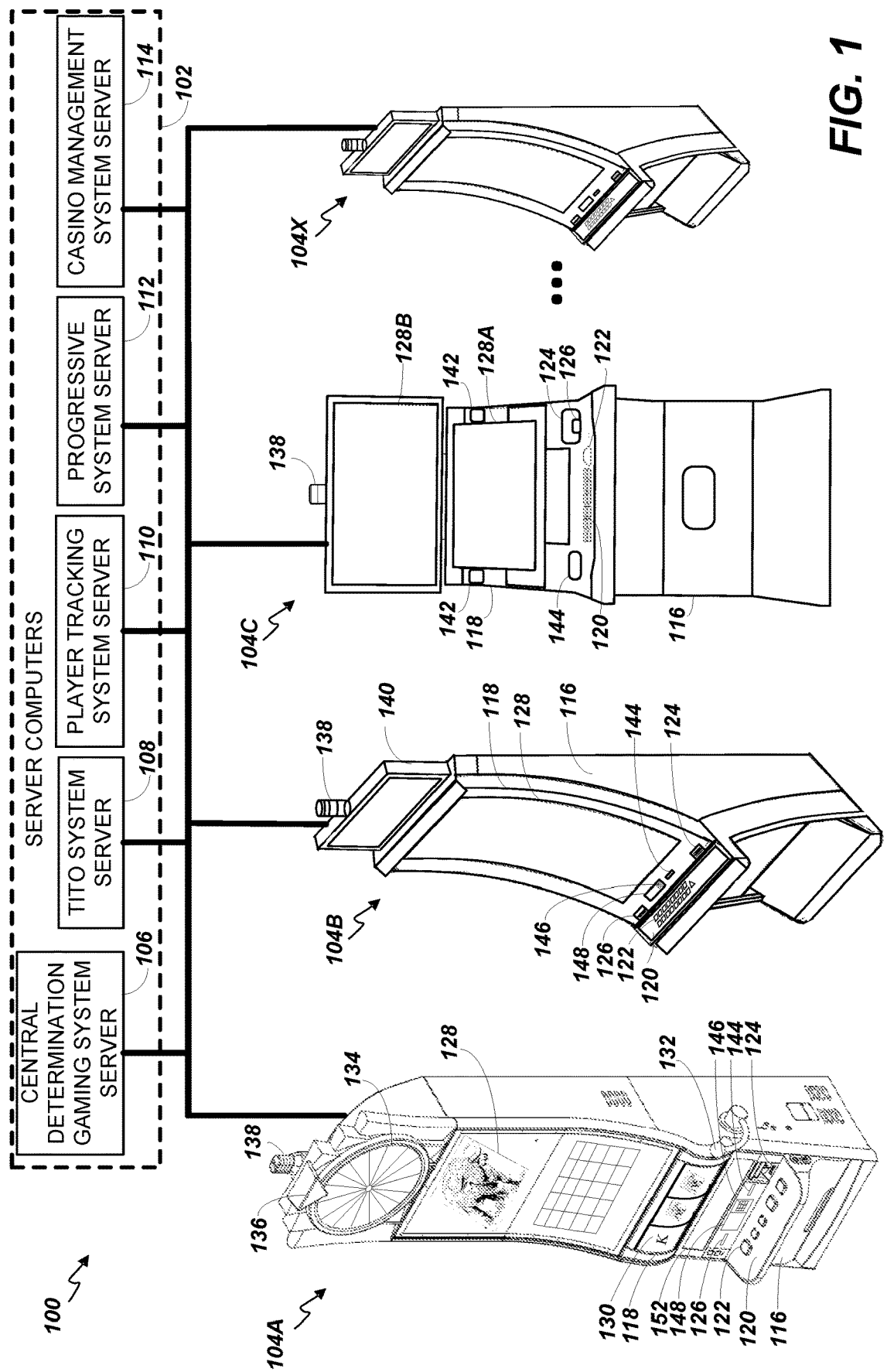
FIG. 1 is a diagram of exemplary EGMs networked with various gaming-related servers.

A progressive blockchain system is described herein that may be used to decentralize aspects of progressive jackpots, allowing EGMs to participate in progressive jackpots using blockchain technology. Decentralized ledger technology (e.g., blockchain) may be used to provide a distributed ledger amongst participating nodes in a blockchain network that may provide aspects of decentralization, immutability, security, and transparency for transaction data added to the ledger. Conventional progressive jackpot systems using a centralized architecture typically rely upon a server (e.g., a progressive server) to centrally manage some progressive jackpots (e.g., individual stand-alone jackpots local to a particular device, linked jackpots shared across multiple devices). Such centralization can be subject to certain exposures, such as server downtime or single point of failure, data integrity risks (e.g., tampering, corruption, hacks), or the like. Aspects of blockchain technology and associated distributed architecture can provide a technological solution to many of these technical problems, allowing blockchain to augment a centralized architecture or provide an alternative architecture.

In an example embodiment, aspects of blockchain technology are employed by the progressive blockchain system to provide progressive jackpots for gaming devices (e.g., EGMs) participating in one or more permissioned blockchains. Each of the trusted, participating EGMs may offer stand-alone progressive jackpot(s) (e.g., progressive jackpots contributed to and made available to win only on the local device) during game play, and may additionally or alternatively offer linked progressive jackpot(s) (e.g., progressive jackpots contributed to and made available to win across multiple devices) during game play. In some embodiments, the participating EGMs may offer player loyalty progressive jackpots provided by a player tracking system, and may be controlled by a player tracking server.

To support such progressive jackpots, the progressive blockchain system provides blockchain(s) that manage transactions for the progressive jackpots. The progressive blockchain system replaces traditional progressive jackpot controllers with a progressive blockchain node executing as a software service of each participating EGM, thereby allowing that EGM to participate in the blockchain(s). More specifically, in example embodiments, the progressive blockchain system defines an account ("progressive jackpot account") within the blockchain(s) for each progressive jackpot supported by the system (e.g., stand-alone jackpots on particular EGMs, linked jackpots shared across pools of EGMs). As games are played on the participating EGMs, each game play contributes an incremental contribution to one or more of the progressive jackpots (e.g., a fractional amount of a primary wager placed during each game round). Each of these incremental contributions causes the EGM to perform progressive deposit transactions into the blockchain, adding those contributions to particular progressive jackpot accounts within the blockchain. As such, the progressive jackpot account accumulates numerous transactions that contribute to a progressive jackpot total that can be determined and displayed by each node participating in that progressive jackpot (e.g., based on inspection of their own local copy of the blockchain and that particular progressive jackpot account). Upon a progressive win event, the winning EGM or an administrative node participating in the blockchain (e.g., a progressive system server node) determines a current total for that particular progressive jackpot based on blockchain data for the progressive blockchain account, decrements that progressive jackpot account by submitting a progressive withdrawal transaction into the blockchain, and pays the player based on the withdrawn funds. The administrative node may reseed the progressive jackpot account in the blockchain by adding a seed deposit transaction to the blockchain for that progressive jackpot account (e.g., adding a minimum reset amount to the progressive jackpot account to reset that progressive jackpot to some pre-defined, non-zero starting value).

In some embodiments, the progressive blockchain system provides a tiered architecture of blockchains. The tiered architecture groups EGMs into EGM clusters. Each EGM cluster includes several EGMs that may be physically in proximity to each other (e.g., two to twelve EGMs). Each EGM cluster shares a cluster blockchain isolated to that cluster, with each EGM in the cluster participating in the cluster blockchain as a progressive blockchain node. An account for each progressive jackpot in which the EGMs participate is added to the cluster blockchain, and each EGM in the cluster adds progressive deposit transactions to the cluster blockchain. There may be several EGM clusters at a given property or across several properties.

In addition, one node of each EGM cluster is designated as a "leader node" for that cluster. Each of the leader nodes of the various EGM clusters participates in a "system blockchain" in which dozens or hundreds of EGMs may participate in progressive blockchains. The leader nodes for each cluster act as transaction replicators between the cluster blockchains and the system blockchain. As nodes add progressive deposits into the cluster blockchain, the leader node for that cluster inspects the blockchain for new progressive deposits. Any deposits newly added to the cluster blockchain are then replicated by the leader node out into the system blockchain, thereby causing the cluster deposits to be reflected in the overall system-level progressive. Similarly, the leader node also inspects the system blockchain for any deposits newly added by other system-level nodes and replicates those deposits (or withdrawals) into the cluster blockchain.

In example embodiments, the progressive blockchain system is comprised of trusted nodes in a permissioned blockchain network. The progressive blockchain provides no tokenization or rewards for mining, as there is no need to incentivize participation for the work contributed by the nodes. Further, the processing and energy consumption demands to nodes on the blockchain can be reduced by replacing the proof of work ("PoW") processing with other consensus mechanisms that dictate which node will add the next block to the blockchain, such as proof of stake ("PoS"), tangle, swirlds, delegated proof of stake, proof of selection, one or more delegated block generators, or the like.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
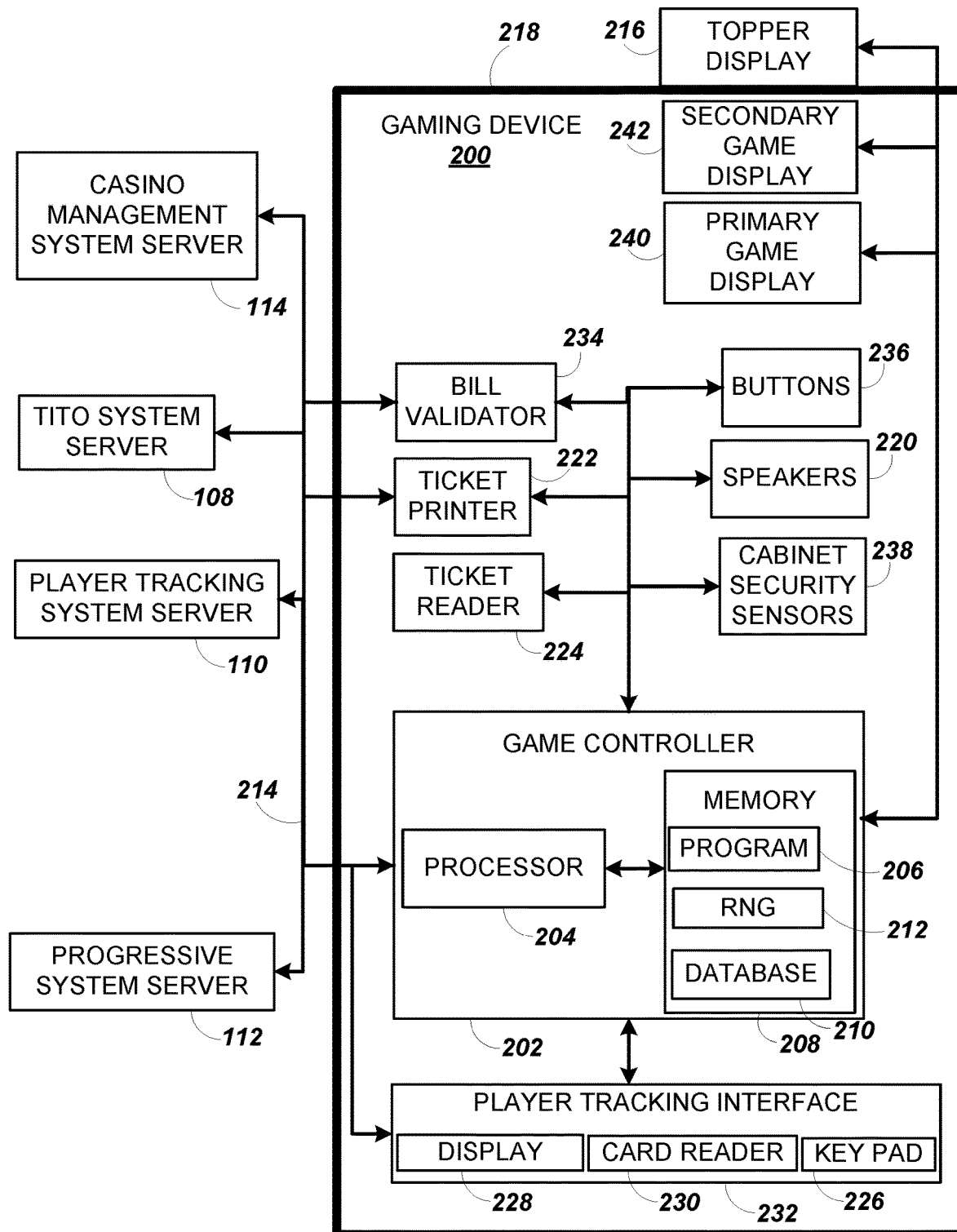
FIG. 2 is a block diagram of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software and provide a technological improvement in the field of EGM technology in that the EGM blockchain technology described herein utilizes aspects of blockchain technology to provide a decentralized progressive jackpot amongst multiple EGMs in a secure fashion and that eliminates the need for some traditional hardware elements.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
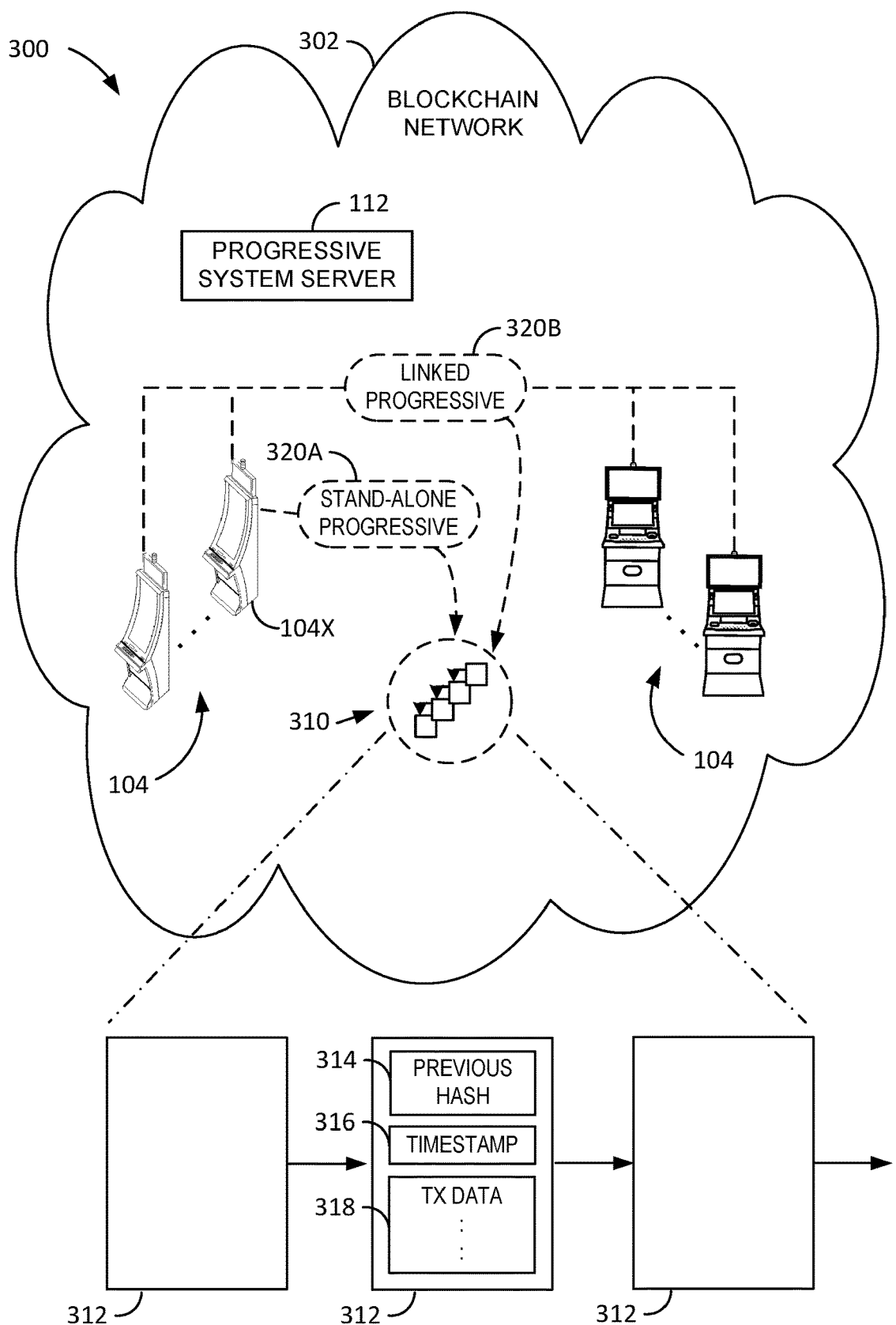
FIG. 3 is a networked environment of a progressive blockchain system in which various devices provide progressive jackpots to potentially be won at gaming devices using a distributed ledger (e.g., blockchain).

FIG. 3 is a networked environment of a progressive blockchain system 300 in which various devices provide progressive jackpots 320 to potentially be won at gaming devices 104 using a distributed ledger (e.g., blockchain) 310. In the example embodiment, the system 300 includes a blockchain network 302 (e.g., a peer-to-peer ("P2P") network) in which various gaming devices 104 participate in a permissioned blockchain 310 that is used to manage transactions for progressive jackpots 320 (e.g., within a wager-based electronic gaming environment). Participating devices may include a variety of different gaming devices 104 including, for example, slot machines, video poker machines, video keno machines, video slots, or other gaming devices used to participate in wager gaming. In some embodiments, participating devices may include personal devices of players. Further, some infrastructure server devices such as the progressive system server 112 may participate in the blockchain 310. While the participating devices are coupled in networked communication through underlying networking technology not shown or described here for purposes of brevity, it should be understood that blockchain network 302 shown in FIG. 3 represents devices participating in a peer-to-peer relationship with other devices permissioned to participate in the blockchain 310, but may also include aspects of centralized communication (e.g., between gaming devices 104 and progressive system server 112). Blockchain network 302 may include any underlying networking technologies, hardware, or protocols sufficient to enable the systems and methods described herein.

The blockchain 310 includes a linked list of blocks 312. Each block 312, in the example embodiment, includes a previous hash 314, a timestamp 316, and one or more blockchain transaction records (also referred to herein as "block transaction data," "TX DATA", or simply transactions or records) 318. As is known in the art, blockchain technology uses aspects of encryption and digital signatures to create a distributed, immutable ledger (e.g., the blockchain 310). The network 302 uses a cryptographic hash function (e.g., SHA-256, Merkle Trees, Keccak/SHA-3, or the like) to generate and memorialize a hash of the previous block as the previous hash 314. The block transaction data 318 includes a record for each transaction 318 added to a particular block 312. The blocks 312 may contain other components not expressly called out here for purposes of brevity. As is known in the art, all nodes in the network 302 execute a blockchain client that allows participation in the network 302 and maintains a copy of the blockchain 310 and may also include pending transactions received from other peer nodes prior to memorialization into a new block 312. Further, each node in the network 302 maintains a unique identity in the network 302 and may generate and use a unique public/private key pair, maintaining the private key locally and publishing the public key to other nodes in the network (e.g., for validating transactions 318 added to the blockchain 310). It should be understood that the present disclosure uses many aspects of blockchain technology (e.g., Blockchain 1.0, Blockchain 2.0 technologies) and, particularly, for permissioned blockchains and smart contracts, that are not expressly described herein for purposes of brevity.

In some embodiments, the progressive blockchain system 300 is comprised of trusted nodes in a permissioned blockchain network (e.g., blockchain network 302) that provides no tokenization or rewards for mining, as there is no need to incentivize participation for the work contributed by the nodes. Further, the processing and energy consumption demands to nodes on the blockchain can be reduced by replacing the proof of work ("PoW") processing with other consensus mechanisms that dictate which node will add the next block to the blockchain, such as proof of stake ("PoS"), tangle, swirlds, delegated proof of stake, proof of selection, one or more delegated block generators, or the like. As such, any of the participating devices may be eligible to consolidate transactions 318 and add blocks 312 to the blockchain 310 and can avoid the processing overhead of typical proof of work consensus protocols.

Progressive jackpots (or just "progressives") 320 are jackpot prizes that are available to potentially be won on the gaming device, typically through a rare occurrence of a particular game outcome specific to an underlying electronic game (e.g., a particular set of symbols appearing on a slot spin outcome, achieving a particular poker hand in video poker, or the like). Progressive jackpots 320 have a jackpot value (e.g., in real or virtual currency) that is incremented by contributions (e.g., micro-transactions) from participating devices (e.g., taking a small fraction of a wager amount during each round of play at that gaming device), and thus the progressives 320 grow over time. Some progressives 320 may have pre-defined minimum or maximum values. In the example embodiment, the progressive blockchain system 300 supports progressive jackpots 320 of two types: stand-alone progressive ("SAP") jackpots 320A and linked progressive jackpots (or just "linked progressives") 320B. SAP progressives 320A are progressive jackpots that are available to be won only at a specific gaming device 104X. SAP progressives 320A receive contributions from the local device, and may receive contributions from an infrastructure server such as the progressive system server 112 (e.g., as a minimum reset amount after a jackpot win). Linked progressives 320B are shared amongst multiple gaming devices 104. Linked progressives 320B are available to be won on those multiple gaming devices 104, and also may receive contributions from any or all of those same gaming devices 104 or the progressive system server 112. Some linked progressives 320B may be local area progressives ("LAPs"), in which multiple devices at a single location (e.g., a single casino property, gaming venue, or such) participate in the linked progressive 320B. Other linked progressives 320B may be wide area progressives ("WAPs"), in which devices from multiple locations (e.g., multiple properties, disparate geographies, or such) participate in the linked progressive 320B. The term "progressive group" may be used herein to identify the group of gaming devices 104 that participate in a particular linked progressive 320B. While only one SAP progressive 320A and one linked progressive 320B is shown here, it should be understood that each gaming device 104 may offer any number of SAP progressives 320A or participate in any number of linked progressives 320B, and the progressive blockchain system 300 may support any or all of such progressives 320.

In the example embodiment, the blockchain 310 is configured with an account for each unique progressive jackpot 320 managed by the blockchain 310. Each "jackpot account" has a unique account identifier (ID) associated with that progressive jackpot 320. The jackpot accounts are used to manage the value of the progressive 320 through time. For example, when introducing and configuring a new progressive jackpot 320 to the system 300, the progressive system server 112 (or local gaming device 104) may create and configure a new account within the blockchain 310 (e.g., as an account creation message to the blockchain 310). In some embodiments, the blockchain 310 may also be configured with progressive escrow accounts that can receive escrow deposit and escrow withdrawal transactions (e.g., moving credit between escrow accounts and associated progressive accounts on the blockchain 310).

In the example embodiment, the participating devices (also referred to herein as "nodes") of the network 302 perform progressive blockchain transactions 318 and track progressive data (e.g., current jackpot totals) through the blockchain 310. One example progressive blockchain transaction 318 performed in the blockchain 310 is a "progressive deposit transaction" (or just "deposit transaction"). Deposit transactions 318 are transactions 318 that add value to a jackpot account, representing an incremental addition to that account. During operation, the gaming devices 104 perform deposit transactions 318 into the blockchain 310 for each game play round (e.g., as a fractional portion of a primary wager). Each deposit transaction 318 added to the blockchain 310 includes a jackpot account ID, an increment amount, and a transaction type ID indicating that this transaction 318 is a deposit type transaction. In some embodiments, no transaction type is used for deposit or withdrawal transactions, but a positive increment amount may be used to indicate a deposit type transaction and a negative increment amount may be used to indicate a withdrawal type transaction. In some embodiments, deposit transactions 318 may include a source device ID of the contributing device, a game round identifier associated with the round of play at the contributing device, a player ID of the player active at the contributing device at the time of the game round, or a timestamp of the game round. In some embodiments, a submitting gaming device 104X may participate simultaneously in multiple progressive jackpots and, as such, may contribute an amount to each of those progressive jackpots for each game round. The submitting device 104X performs a separate deposit transaction 318 into the blockchain 310 for each individual progressive 320, using different jackpot account IDs for each separate contribution. In some embodiments, a single deposit transaction 318 may identify multiple jackpot account IDs, and may include different increment amounts for each identified jackpot account ID, thereby allowing multiple deposits to be aggregated into a single transaction record within the blockchain 310.

Another example progressive blockchain transaction 318 performed in the blockchain 310 is a "progressive withdrawal transaction" (or just "withdrawal transaction"). Withdrawal transactions 318 are performed when a participating gaming device 104 wins a particular jackpot (referred to herein as the "winning gaming device" and the "subject jackpot"). During operation, in the example embodiment, once a jackpot win has been achieved at the winning gaming device 104X, the winning gaming device 104X captures a timestamp at the time of the win ("win timestamp") and determines a current total jackpot value of the subject jackpot. In one embodiment, the winning gaming device 104X searches the blockchain 310 for all deposit transactions 318 made to the account ID of the subject jackpot (or just "subject account") since the time of the last win (e.g., since the last withdrawal transaction associated with a win event). The winning gaming device 104X adds up all of the identified deposit transactions 318 to determine the total jackpot value. In another embodiment, the winning gaming device 104X may transmit a jackpot win message (e.g., an off-blockchain network message) to the progressive system server 112 indicating that the subject jackpot has been won at the winning gaming device (e.g., identifying device ID of the winning gaming device 104X, the timestamp of the win time, and the jackpot account ID of the subject jackpot). Upon receipt of the jackpot win message, the progressive system server 112 may search the blockchain 310 for the deposit transactions 318 of that progressive jackpot and determine the total jackpot value.

Once the total jackpot value is determined, the progressive blockchain system 300 causes that jackpot to be awarded to the player (e.g., crediting the player's balance at the gaming device 104X with the total jackpot value, summoning service personnel for a hand pay, crediting a player account with the total jackpot value, or the like). Further, the winning gaming device 104X also creates and transmits a withdrawal transaction 318 into the blockchain 310. The withdrawal transaction 318 includes the jackpot account ID, the total jackpot value awarded during this win (e.g., and subsequently reduced from the jackpot account ID), the win timestamp, and a transaction type ID indicating that this transaction 318 is a win withdrawal type transaction. The withdrawal transaction 318 may include other win information, such as the device ID of the winning gaming device 104X, a player ID of the winning player, a method of payment performed for this win event, or such.

In some embodiments, some progressive jackpot accounts in the blockchain 310 may be "owned" and controlled by a designated device (e.g., as the account holder of the blockchain account for that jackpot). For example, SAP jackpots 320A may be controlled by the associated gaming device 104. For linked progressive jackpots 320B, a central device (e.g., progressive system server 112) may be the designated owner. In such embodiments, deposit transactions to the owned progressive jackpots 320 may be made by other nodes, but withdrawal transactions from that account may be restricted to only the controlling device. Upon a jackpot win, the controlling device may receive an indication of a win event from another device, and the controlling device performs the withdrawal transaction, removing the win amount from the jackpot account in the blockchain and transmitting a message to the winning device to credit the win amount to the player.

In some embodiments, the progressive blockchain system 300 may facilitate other blockchain uses for the blockchain 310 and participating devices. In other words, the blockchain 310 may support other types of blockchain transactions 318 unrelated to progressive jackpots 320.

In the example embodiment, any node in the blockchain 310 may participate in creation of blocks 312 (e.g., as miner nodes).

Figure 4:
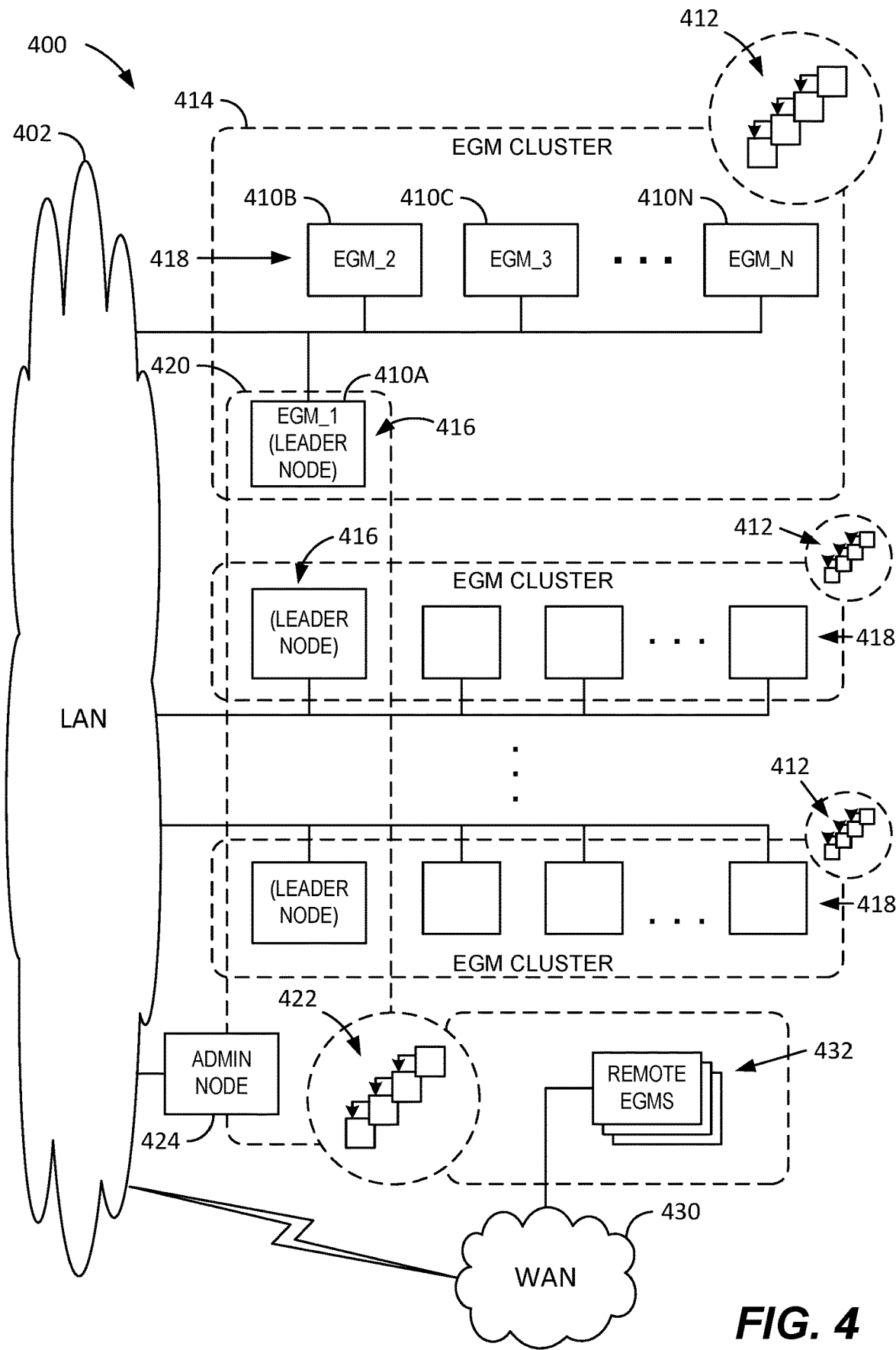
FIG. 4 is a networked environment of a progressive blockchain system in which EGMs provide progressive jackpots using one or more blockchains.

FIG. 4 is a networked environment of a progressive blockchain system 400 in which EGMs (e.g., gaming devices 104, 200) provide progressive jackpots using one or more blockchains 412, 422. In some embodiments, aspects of the progressive blockchain system 400 may be similar to the progressive blockchain system 300 of FIG. 3, and the blockchains 412, 422 may be similar to the blockchain 310 shown in FIG. 3. In the example embodiment, the progressive blockchain system 400 provides a two-tiered blockchain architecture of EGM clusters 414. The progressive blockchain system 400 includes a set of EGMs 410A-N (collectively, EGMs 410) logically grouped together as an EGM cluster 414. EGMs 410 may be grouped into EGM clusters 414 based on, for example, physical proximity to each other (e.g., a bank of EGMs, a room of EGMs at a property, all of the EGMs at a particular property), network connectivity (e.g., by subnet or IP range, by shared connectivity to a particular network device), or by a logical grouping (e.g., a set of EGMs participating in a particular progressive jackpot, a new set of EGMs recently installed at a property). Each of the EGMs 410 may be similar to the gaming devices 104 shown in FIG. 1 or the gaming device 200 shown in FIG. 2. The EGMs 410 are network-connected to a local area network (LAN) 402 (e.g., an Ethernet/IP network). While not individually numbered, several EGM clusters similar to EGM cluster 414 are illustrated in FIG. 4. And while not individually numbered, each of those EGM clusters similarly contains one or more EGMs similar to the EGMs 410 of EGM cluster 414.

In the example embodiment, each EGM 410 participates as a node in a cluster blockchain 412. The cluster blockchain 412 is a blockchain that is restricted to only the EGMs 410 within that cluster 414. Each EGM 410 of the cluster 414 executes a blockchain software service (not separately shown) that allows the EGM 410 to participate in blockchains (e.g., as participating nodes of the cluster blockchain 412 and/or the system blockchain 422). Each of the EGMs 410 within the cluster 414 shares the cluster blockchain 412, may inspect the cluster blockchain 412, may broadcast deposit transactions into the cluster blockchain 412 (e.g., as wagers are made in a progressive game), and may bundle transactions into blocks and add blocks to the cluster blockchain 412, validate blocks of the cluster blockchain, or otherwise participate in the cluster blockchain 412. As such, the EGMs 410A-410N are the set of participating nodes in the cluster blockchain 412. In some embodiments, EGMs 410 are configured (e.g., by a technician) with a cluster identifier associated with a particular EGM cluster 414 and each EGM joins the cluster (e.g., during reboot, start-up of blockchain services, or such). A transaction may be added to the cluster blockchain 412 documenting the registration events. In some embodiments, the EGM may additionally or alternatively register into participation into one or more progressives. Progressive join or quit events may be added to the cluster blockchain 412, thereby journaling which EGMs 410 are participating in any particular progressive at any given time.

Each EGM cluster 414, in the example embodiment, also designates one of the EGMs 410 as a "leader node" 416 for that EGM cluster 414. In the example shown in FIG. 4, EGM_1 410A is currently designated as the leader node 416 for that cluster 414. Similarly, each of the other clusters also has a leader node 416 designated. The remaining nodes of the cluster 414 are considered subordinate nodes 418. Each leader node 416, in addition to participating in the cluster blockchain 412 for their own cluster 414, additionally participates in the system blockchain 422. The system blockchain 422 is configured to journal progressive jackpots across all EGM clusters 414, as well as perhaps other non-clustered EGMs. In some embodiments, the system blockchain 422 may also include remote EGMs 432 (e.g., from stand-alone EGMs or similarly-clustered EGMs) across a wide area network (WAN) 430. For example, local EMG clusters 414 may participate over the WAN 430 with remote EGMs 432 (e.g., with one or more EGM clusters 414 at the remote site) in one or more wide area progressive jackpots using blockchain 422. The collection of EGMs or other devices (e.g., progressive system server 112) participating in the system blockchain 422 are referred to herein as system nodes 420. As such, leader nodes 416 participate in both their local cluster blockchain 412 and the system blockchain 422. In some embodiments, any EGM 410 of a cluster 414 may be designated as the leader node 416, and the designation of the leader node 416 may be dynamically determined or transferred from one EGM 410 to another EGM 410 within the cluster 414 at any time (e.g., if the current leader node 416 goes offline or is otherwise unable to participate as the leader node 416). In some embodiments, the designation of leader node is provided to an EGM 410 of the cluster 414 that is otherwise idle (e.g., not currently being operated by a player).

During operation, EGMs 410 generate progressive deposit transactions (e.g., during each play of the EGM) that are broadcast to the other EGMs 410 within the cluster 414. One of the EGMs 410 successfully bundles one or more transactions into a new block and adds the new block to the cluster blockchain 412. As such, the progressive deposits are added to the ledger of an account for that progressive jackpot within the cluster blockchain 412. Each of the EGMs 410 in the cluster 414 also receive a copy of the new block and can validate the new block and compute an updated total for the progressive jackpot from the blockchain 412. This updated total is then displayed by the EGM 410 on their own progressive jackpot meter.

Additionally, other EGMs participating in the same progressive jackpot are informed of the new progressive deposits generated by EGMs 410 of the EGM cluster 414. More specifically, the leader node 416 of the cluster 414 replicates cluster-level transactions (e.g., progressive deposits made by cluster EGMs 410) out into the system blockchain 422 as "outbound replicated transactions." The leader node 416 is configured to monitor their local cluster blockchain 412 for any new cluster-level progressive transactions. Each newly-detected cluster-level progressive transaction is copied by the leader node 416 and broadcast as a new transaction out into the system blockchain 422 (e.g., to all of the system nodes 420). One of the system nodes 420 bundles those new transactions, perhaps with other transactions, and successfully adds a new block to the system blockchain 422, thereby updating the system-level ledger with updated deposits for the associated progressive jackpot.

The leader nodes 416 also replicate new transactions into their EGM cluster 414 as "inbound replicated transactions." The leader node 416 is configured to monitor the system blockchain 422 for any new system-level progressive transactions. In some embodiments, the leader node 416 may include a list of progressive jackpots associated with their cluster 414 (e.g., accounts within the blockchains 412, 422 for which any of the EGMs 410 participate within the cluster 414). Each newly-detected system-level progressive transaction is copied by the leader node 416 and broadcast as a new transaction into the cluster blockchain 412 (e.g., to all of the cluster EGMs 410). One of the cluster EGMs 410 bundles those new transactions, perhaps with other transactions, and successfully adds a new block to the cluster blockchain 412, thereby updating the cluster-level ledger with updated deposits from other EGMs outside of the cluster 414. Each cluster EGM 410 may then compute an updated total for their progressive jackpot from the blockchain 412. This updated total is then displayed by the EGM 410 on their own progressive jackpot meter.

In some embodiments, EGMs 410 or system nodes 420 contend to bundle transactions and add new blocks to the cluster blockchain 412 or the system blockchain 422, respectively, based on techniques known in the art (e.g., by proof of work). In other words, each EGM 410 in the EGM cluster 414 may act as a miner node, and each leader node 416 or other system node 420 in the system blockchain 422 may act as a miner node. In the example embodiment, at the cluster level, one of the EGMs 410 in each EGM cluster 414 is designated the blocking node for the cluster 414, and that one node collects and bundles all cluster-level transactions into the cluster blockchain 412. For example, the admin node 424 may be designated the blocking node for the blockchain 422 (e.g., for nodes 420), the leader nodes 416 may be designated as blocking nodes for their respective clusters 414, or the progressive system server 112 may be designated as the blocking node for the blockchain 310. In some embodiments, the EGMs 410 contend to be the blocking node for the cluster 414 (e.g., randomly, by a single proof of work contest, by contending for control of a shared resource (semaphore), or such). In some embodiments, the system-level nodes may similarly designate a system-level blocking node for the system blockchain 422 by any of the above-described methods.

In some embodiments, an admin node 424 participates in the system blockchain 422. The admin node 424 may broadcast transactions into the system blockchain 422, access the blockchain 422, or otherwise participate as a node in the system blockchain 422. In some embodiments, the progressive system server 112 may be the admin node 424. The admin node 424 may perform management operations associated with the various progressive jackpots being provided by the progressive blockchain system 400. For example, the admin node 424 may administer win events associated with the various progressive jackpots. Upon the occurrence of a win event at a particular EGM 410, the winning EGM 410 may announce the event by adding a transaction into the cluster blockchain 412 or the system blockchain 422. All EGMs may monitor the blockchains 412, 422 for such a win event to determine when the current jackpot is no longer available to be won by the local EGM 410 (if that EGM 410 was participating in the associated progressive). The winning EGM 410 may additionally or alternatively transmit a win event message directly to the admin node 424. The admin node 424 may determine a total win amount for the progressive jackpot (e.g., totalling all of the transactions in the blockchain 422 since the last win event associated with the progressive based on a timestamp of the last win event). The admin node 424 verifies the winning event and updates the system blockchain 422 to reset that progressive jackpot account. For example, the admin node 424 may broadcast a progressive award approval transaction instructing the winning EGM to award the progressive jackpot to the player and then reset the progressive jackpot account in the system blockchain 422 associated with the progressive to a predetermined progressive reset amount. In some embodiments, the admin node 424 may also seed the progressive by broadcasting a transaction adding the seed amount to that progressive in the system blockchain 422. As such, the progressive jackpot is effectively reset and any progressive deposits, or "progressive increments," made since win event become available, along with the reset amount and any seed amount, to be won by participating EGMs.

In the example embodiment, the blockchains 412, 422 are configured to add a new block on a periodic, regular basis. For example, the blockchains 412, 422 may be configured to add a new block to their respective blockchains 412, 422 every 0.1 seconds or every 0.5 seconds (e.g., if there are any new transactions to be added). The blockchains 412, 422 may define or otherwise include a blocking interval setting that may be used by the blocking nodes to determine when and how frequently to bundle transactions and generate a new block. In some embodiments, each of the blocking nodes may share a heartbeat to time when new blocks are added into each cluster blockchain 412 and when new blocks are added into the system blockchain 422. The heartbeat in conjunction with carefully timed blocking between the cluster level and the system level may allow the progressive blockchain system 400 to minimize latency for propagation of transactions out from the cluster blockchains 412 into the system blockchain 422 and subsequently back down into the other cluster blockchains 412. Shorter blocking intervals may generally increase propagation time for transactions through the blockchain 412 and may incur greater resource costs (e.g., more processing time, more total blocks added to the blockchains 412, 422 over time). The frequency interval of the leader nodes 416 may be separately configurable for outbound replication timing going from the cluster blockchain 412 out into the system blockchain 422 or for inbound replication timing going from the system cluster 422 into the cluster blockchain 412.

In some embodiments, smart contracts may be implemented in the blockchains 412, 422. In one embodiment, win event management may be implemented as a smart contract. For example, the blockchains 412, 422 may be configured with a stored procedure for the accounting operations performed upon a win event (e.g., in lieu of, or supplementing the operations of, the admin node 424). The submission of a win event transaction into the cluster blockchain 412 may trigger a stored procedure that, amongst other accounting and audit compliance operations, determines the win total for that progressive jackpot from the blockchain 412, adds a transaction of the progressive jackpot win total into the blockchain 412, adds a transaction resetting the progressive jackpot to a progressive jackpot reset amount into the blockchain 412, and adds a transaction seeding the progressive jackpot into the blockchain 412. The amount of the seed transaction may be an amount of all or a portion of a progressive escrow account and the sum of progressive deposit transactions that have occurred since the jackpot win event.

In some embodiments, the leader node 416 for the EGM cluster 414 may aggregate outbound transactions before broadcasting transactions out into the system blockchain 422. For example, during a single time window between outbound replications, the leader node 416 may receive multiple deposit transactions for the same progressive jackpot from one or more of the EGMs 410. In some embodiments, the leader node 416 replicates these transactions one-for-one from the EGM cluster 414 out into the system blockchain 422. In other embodiments, the leader node 416 may combine two or more cluster-level pending transactions associated with the same progressive into a single transaction that is broadcast out into the system blockchain 422 (e.g., summing the deposit amounts from the individual cluster-level transactions into a sum total for the single system-level transaction). As such, less total transactions are broadcast out into the system blockchain 422. In some embodiments, blocking nodes in the system blockchain 422 may similarly aggregate multiple system-level pending transactions for the same progressive into a single transaction to be added to the system blockchain 422. As such, the total number of transactions added into the system blockchain 422 is reduced, thereby also reducing summing computation at each EGM 410 when determining current jackpot amounts from the transactions in the cluster blockchains 412. In some embodiments, cluster-level transactions added to cluster blockchains 412 may include additional or differing data fields than system-level transactions added to the system blockchain 422. For example, cluster-level progressive deposit transactions may include data fields such as EGM identifier, timestamp, deposit amount, progressive identifier/account, and player identifier. In direct replication embodiments, the cluster-level transaction data may be replicated out to the system blockchain 422 as a system-level transaction (e.g., one for one). In other embodiments, the leader nodes 416 may only use some of the cluster-level transaction data fields when broadcasting a system-level transaction. For example, the system-level transaction may include a deposit amount (e.g., sum of deposits), a progressive identifier/account, and a timestamp (e.g., made at the time of aggregation). As such, total data in the system blockchain 422 may be reduced.

In some embodiments, individual (e.g., un-clustered) EGMs may participate in the system blockchain 422. In some embodiments, the blockchains 412, 422 may additionally include data not associated with progressive jackpots. For example, the EGMs may use the blockchains 412, 422 to memorialize audit data, accounting data, player data, game play data, administer TITO ticketing services, or other data generated by or otherwise associated with electronic game play at the EGMs. In some embodiments, the progressive blockchain system 400 may implement components or modules of blockchain technology such as is associated with Hyperledger Fabric technology. In some embodiments, the progressive blockchain system 400 may include a third tier of sub-clustered EGMs (e.g., with one EGM acting as leader node between, for example, EGM cluster 414 and a sub-cluster of EGMs (not shown)).

Figure 5:
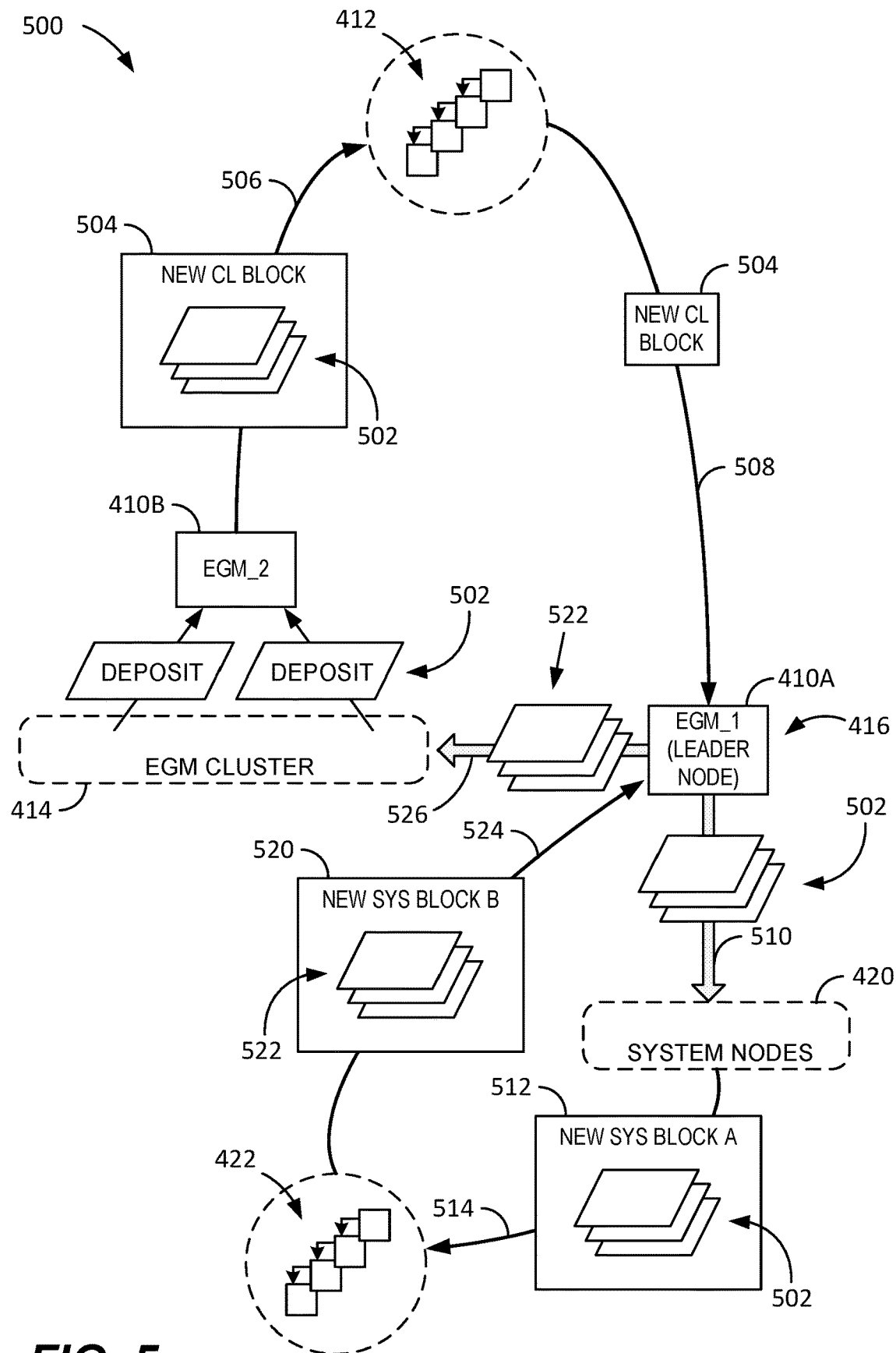
FIG. 5 is a data flow diagram illustrating various blockchain operations performed within the progressive blockchain system.

FIG. 5 is a data flow diagram 500 illustrating various blockchain operations performed within the progressive blockchain system 400. In the example embodiment, diagram 500 illustrates both an outbound replication process and an inbound replication process. For the outbound replication process, various EGMs 410 within the EGM cluster 414 generate deposit transactions 502 during operation (e.g., during game play). Periodically, the nodes of the cluster 414 (e.g., the blockchain services executing on the EGMs 410) collect multiple transactions 502 from other nodes of the cluster 414, bundle those transactions 502 into a new cluster block 504, and may contend with other nodes of the cluster 414 to add the new cluster block 504 to the cluster blockchain 412. In the example shown here, EGM_2 410B has been tasked to add new cluster block 504 to the cluster blockchain 412 (depicted here as arrow 506).

The leader node 416 of EGM cluster 414, EGM_1 ("leader node") 410A, inspects the cluster blockchain 412 looking for any new transactions 502 added to the blockchain 412. In the example embodiment, the leader node 410A identifies the new cluster block 504 (depicted here as arrow 508) and extracts the new transactions 502 from the block 504. The leader node 410A then broadcasts each of the transactions 502 out to the system nodes 420 as new transactions for addition into the system blockchain 422 (depicted here as arrow 510). One of the nodes within the system nodes 420 collects the new transactions 502, and perhaps other transactions broadcast within the system nodes 420, bundles those transactions 502 into a new system block ("new sys block A") 512, and may contend with other nodes of the system nodes 420 to add the new sys block A 512 to the system blockchain 422. In this example, one of the system nodes 420 (not depicted) has been tasked to add the new system block 512 to the system blockchain 422 (depicted here as arrow 514). As such, new transactions being generated from within the EGM cluster 414 is both memorialized within the cluster blockchain 412, and is also replicated out to the system blockchain 422, thereby completing the outbound replication process.

For the inbound replication process, the leader node 410A of EGM cluster 414 identifies that a new system block 520 ("new sys block B") has been added to the system blockchain 422 (depicted here as arrow 524). The new system block 520 includes new transactions 522 (e.g., one or more transactions not yet processed by the leader node 410A). The leader node 410A extracts the new transactions 522 from the block 520 and broadcasts each of those new transactions 522 into the EGM cluster 414 (e.g., to all of the cluster EGMs 410) (depicted here as arrow 526). While not separately depicted here, these new transactions 522 may subsequently be added to the cluster blockchain 412 similar to how the transactions 502 were added as described above. As such, new transactions being generated from outside the EGM cluster 414 are both memorialized within the system blockchain 422, and is also replicated into the cluster blockchain 412, thereby completing the inbound replication process.

In normal operation, transactions 502 propagate throughout the blockchains 412, 422 and are thus available to any of the participating devices (e.g., EGMs 410, system nodes 420, admin nodes 424, remote EGMs 432, and so forth). However, in some situations, one or more EGMs 410 may become separated, segmented, or otherwise disconnected from some or all of the progressive blockchain system 400. For example, presume EGM_2 410B becomes isolated from the EGM cluster 414 and the network 402 at a point in time. In such a situation, EGM_2 410B generates deposits that are not able to be communicated into the blockchains during the disconnect. Further, if a win event occurs for a shared jackpot during the segmentation, either at the segmented EGM or at another EGM on the broader, connected blockchain nodes, the progressive blockchain system 400 provides methods to deal with the segmentation.

In one embodiment, segmented deposits are applied only to the local EGM or to the segmented cluster while the segmentation is occurring. When the segmented network rejoins with the broader blockchains 412, 422, the queued (e.g., unreplicated) transactions from within the segmented network are replicated out to the blockchains 412, 422 as new transactions (e.g., rebroadcast by the segmented EGM or leader node). Further, the segmented nodes reintegrate into the blockchains 412, 422 by reacquiring the latest blocks to become current. If no win event occurred during the segmentation, then the blockchains 412, 422 will be updated with the queued transactions and continue normal operation. In one embodiment, if a win event occurs within the segmented network during the segmented event, then the win event is awarded based on the last good copy of the blockchain in combination with the deposits generated within the segmented network. When segmentation is resolved, if no conflicting win event had occurred outside the segmented network, then the replication of the segmented transactions (which include the win event withdrawal and seed deposit) will merge into the blockchains 412, 422 and update the current progressive total naturally. Any deposit transactions occurring in the unsegmented network will not be won by the segmented win event, but are instead applied to the next win event. If a conflicting win event did occur in the unsegmented network, then the operator may configure the progressive blockchain system 400 based on operator preference. The operator may configure the blockchain system 400 to honor both win events, or may configure win event protocol to determine whether segmentation is currently occurring on the winning EGM and resolve the segmentation and conflicting wins manually. In some embodiments, if one or more progressive jackpot win events occur during a segmented scenario, awarding of the progressive jackpot(s) may be postponed until the segmentation event is resolved. Following the segmentation event resolution, any jackpots are awarded based on the timing of the jackpot win events (e.g., based on timestamps of the win events, the first progressive win event jackpot may be awarded the amount of the progressive at the time of the win event, the second progressive win event jackpot may be awarded the amount of the jackpot following reset and any subsequent accumulated contributions since the time of the preceding win event, and so forth).

Figure 6A:
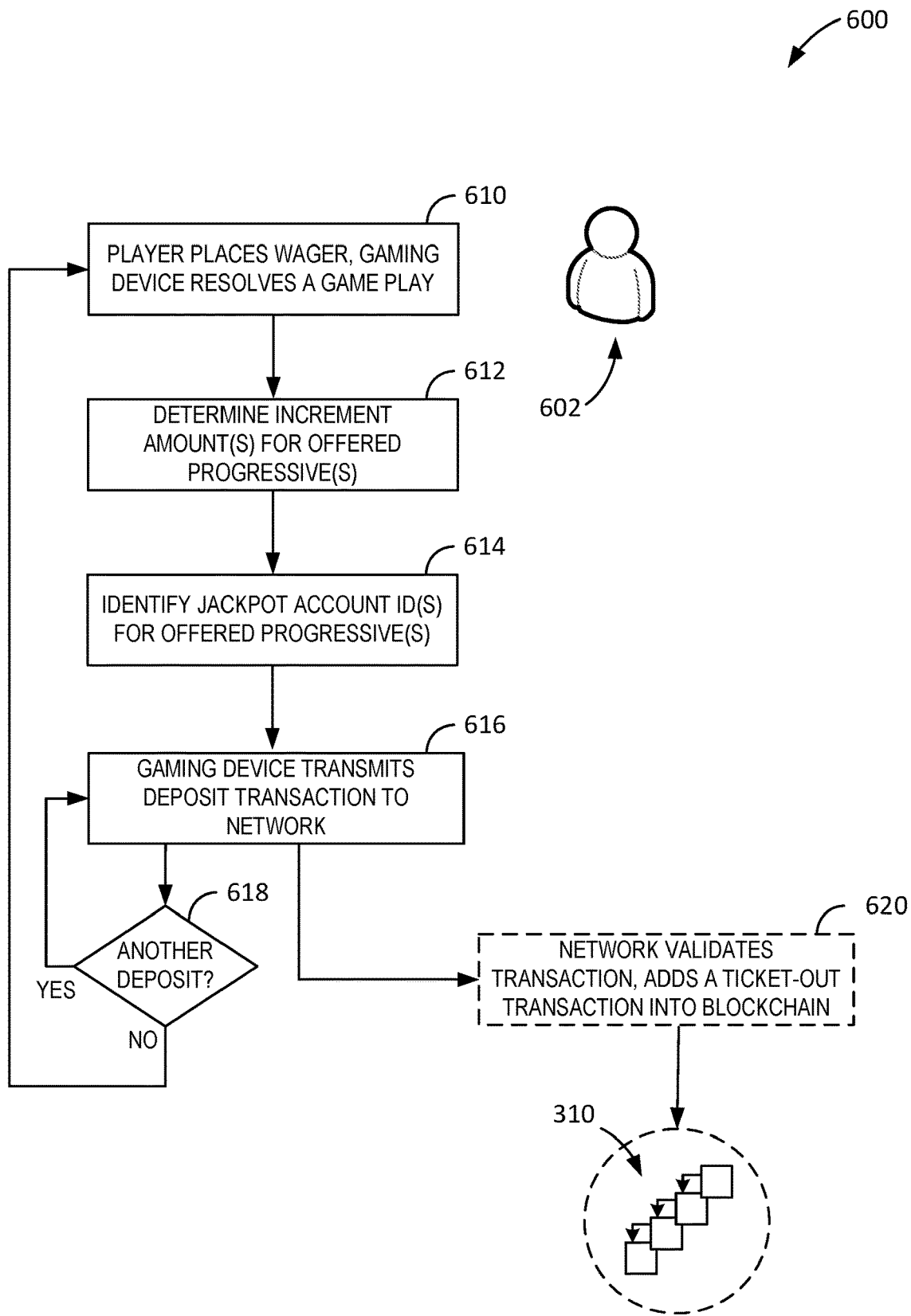
FIG. 6A illustrates an example method for contributing incremental additions to a progressive jackpot using the progressive blockchain system and the P2P network shown in FIG. 3

FIG. 6A illustrates an example method 600 for contributing incremental additions to a progressive jackpot 320 using the progressive blockchain system 300 and the blockchain network 302 shown in FIG. 3. In the example embodiment, the method 600 is performed by a gaming device 104, 200 (e.g., as the "submitting device") during game play of an electronic game that participates in one or more progressive jackpots 320 and where a player 602 submits a wager during a round of game play (e.g., real currency, virtual currency). At operation 610, in the example embodiment, the player 602 places a wager (e.g., from a balance on the gaming device 104X) during a round of game play and the gaming device 104X resolves the round of game play. Associated with that round of game play, at operation 612, the gaming device 104X determines an increment amount for each offered progressive 320. In one embodiment, the gaming device 104X increments one or more offered progressives 320 by a pre-determined amount based on the primary wager amount made by the player 602 during that game play round. For example, the gaming device 104X may contribute $0.01 to a progressive 320 when the primary wager is between $1.00 and $1.50, $0.02 when the primary wager is between $2.00 and $2.5, and $0.03 when the primary wager is between $3.00 and $5.00. In another embodiment, the gaming device 104X may contribute a pre-determined percentage (e.g., 0.1%, 0.3%, 0.5%, 1.0%, or such) of the primary wager amount. In some embodiments, the gaming device 104X may read a configuration record from the blockchain 310 that defines how the gaming device 104X determines increment amounts. At operation 614, the gaming device 104X identifies jackpot account ID(s) for each of the offered progressives. In some embodiments, the gaming device 104X may decrement any or all of the increment amounts from the primary wager, as those funds will be allocated to the offered progressives 320.

At operation 616, in the example embodiment, the gaming device 104X creates a deposit transaction 318 having the jackpot account ID for a progressive jackpot 320 and an increment amount determined for that progressive jackpot 320, as well as optionally other deposit transaction data fields, and transmits that deposit transaction 318 to the network 302 (e.g., broadcasting to neighbor nodes, or the like). If, at test 618, the gaming device 104X participates in multiple progressive jackpots 320, then the gaming device 104X may transmit an additional deposit transaction for each other progressive jackpot 320 offered by the gaming device 104X, each deposit transaction being directed at a different progressive jackpot 320, and with perhaps the same or different determined increment amounts. When no other progressive jackpots 320 remain to receive a deposit transaction, then the gaming device 104X returns to operation 610 and allows the player 602 to play another game round.

In the example embodiment, the deposit transaction(s) 318 propagate through the nodes of the network 302 and are eventually bundled together with other transactions 318 and memorialized in a new block 312 that is added to the blockchain 310 of all participating nodes at operation 620. It should be understood that the operations shown in broken line in FIGS. 6A and 6B are operations performed by a participating node in the network 302 (e.g., a miner node or node that is otherwise tasked with creating the next block 312 on the blockchain 310), and those operations are not necessarily performed by the submitting or winning device.

Figure 6B:
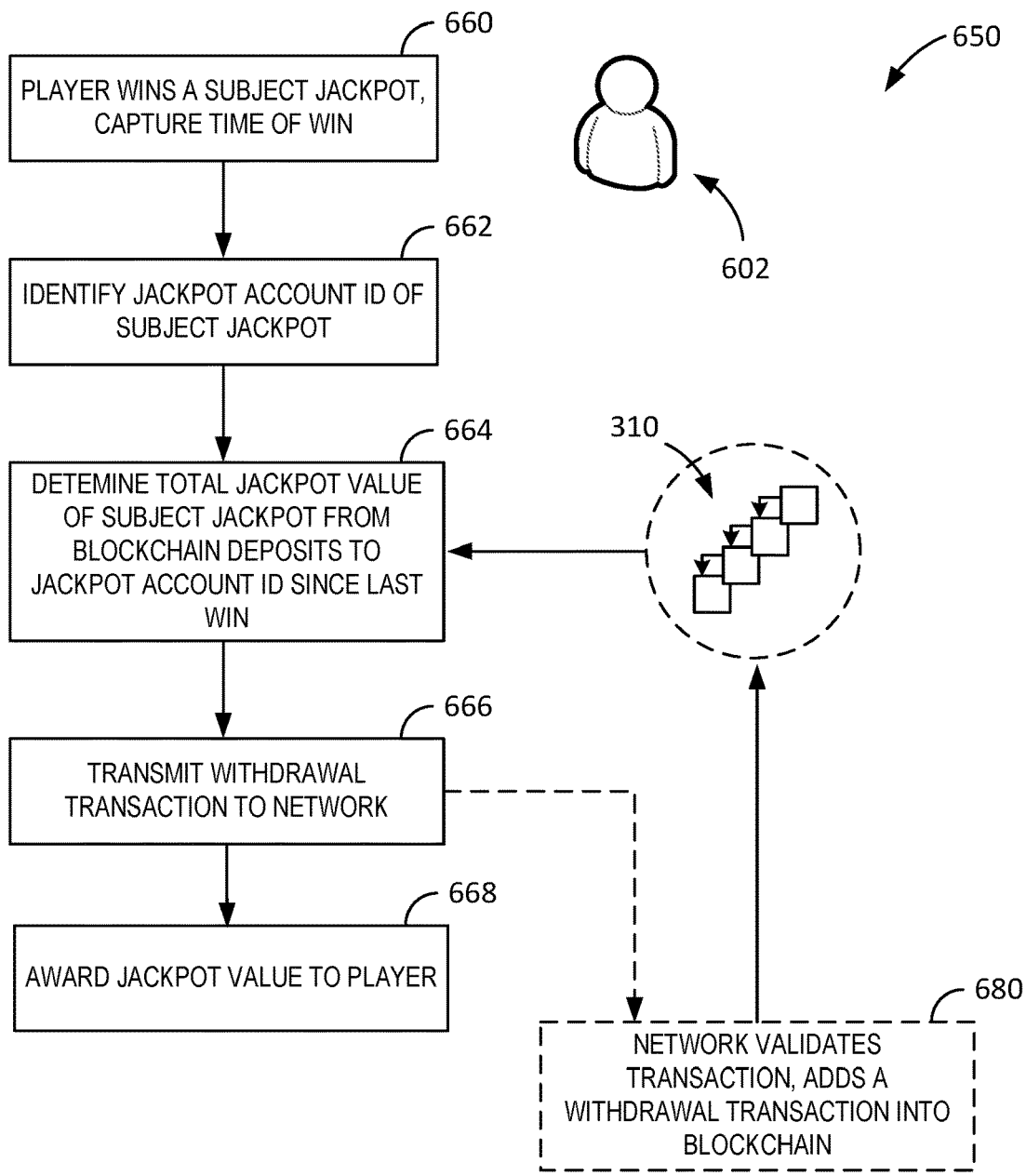
FIG. 6B illustrates an example method for awarding a progressive jackpot when the player has won that particular progressive jackpot during game play at the winning device.

FIG. 6B illustrates an example method 650 for awarding a progressive jackpot 320 when the player 602 has won that particular progressive jackpot during game play at the winning device 104X. While the example submitting device 104X and winning device 104X are described here using the same identifier, it should be understood that any participating device 104 may be either the submitting device or the winning device. In the example embodiment, at operation 660, the player 602 wins one of the progressive jackpots 320 (the "subject jackpot") offered by the winning device 104X, and the winning device 104X captures a win time for the win event (e.g., a timestamp of the win). The winning device 104X identifies a jackpot account ID for the subject jackpot at operation 662.

At operation 662, the winning device 104X determines a current jackpot value of the subject jackpot using transactions memorialized in the blockchain 310. More specifically, in one example embodiment, the winning device 104X searches a local copy of the blockchain 310 and identifies all deposit transactions involving the jackpot account ID of the subject jackpot since the last time that subject jackpot was won. For example, the winning device 104X may search for the most recent withdrawal transaction involving the jackpot account ID and may retrieve a last won timestamp of that withdrawal transaction. The winning device 104X may then search the blockchain 310 for all deposit transactions involving the jackpot account ID that are timestamped with transaction times occurring between the last won timestamp and the current win timestamp collected at operation 660. The winning device 104X may then determine the total jackpot value of the subject jackpot by adding all of those identified deposit transactions together (e.g., starting at zero or a pre-defined initial minimum and adding each increment amount into the total jackpot value). This total jackpot value represents the jackpot award owed to the winning player 602.

At operation 666, the winning device 104X creates and transmits a withdrawal transaction 318 into the P2P network for addition to the blockchain 310. The withdrawal transaction 318 may include the current win timestamp, the last won timestamp, the determined total jackpot value, the device ID of the winning device 104X, or the like. The new withdrawal transaction 318 propagates through the nodes of the network 302 and is eventually bundled together with other transactions 318 and memorialized in a new block 312 that is added to the blockchain 310 of all participating nodes at operation 680. At operation 668, the winning device 104X causes the progressive jackpot (e.g., the determined total jackpot value) to be awarded to the player 602.

In some embodiments, the progressive blockchain system 300 is configured to implement smart contracts within the blockchain 300. For example, the progressive blockchain system 300 or another participating node may upload a jackpot authorization smart contract (not separately depicted) into the blockchain 310 that is configured to perform jackpot redemptions (e.g., perform authentication or authorization tasks before awarding the winning device 104X after a win event). For example, the winning device 104X may be configured to transmit a win notification blockchain transaction into the blockchain 310, and the smart contract may be configured to trigger upon detection of any new win notification transaction appearing in the blockchain 310. The smart contract may read the device ID of the winning device 104X and the jackpot account ID from the win notification transaction and verify whether the winning device 104X is in an inclusion list of devices participating in the identified progressive jackpot 320. In some embodiments, the smart contract may be configured to determine the jackpot value at the time of the win event (e.g., based on timestamp in the win notification record, similar to operation 664). The win notification transaction may include a digital signature made by the winning device 104X (e.g., with its own private key) and the smart contract may decrypt the digital signature to determine authenticity of the suspect device 104X attempting to claim the prize. If the suspect device 104X is not in an approved list of devices 104 associated with the identified progressive jackpot 320, then the smart contract may deny the payout. If the suspect device 104X is in the approved list of devices 104, then the smart contract may automatically enter a withdrawal transaction into the blockchain 310 to complete the payout to the winning device 104X. In some embodiments, the smart contract transmits a network message directly to the winning device verifying the validity of the win event and jackpot value, thus allowing the winning device to provide the jackpot value to the player (e.g., at operation 668).

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A computing device comprising:
a memory storing a first blockchain and a second blockchain in which the computing device participates, the first blockchain supporting a first plurality of computing devices, the second blockchain supporting a second plurality of computing devices, a first progressive jackpot being supported by a first account defined within the first blockchain and a second account defined within the second blockchain; and
at least one processor configured to execute instructions which, when executed, cause the at least one processor to:
identify a plurality of deposit transactions for the first account within the first blockchain;
determine a total sum amount of the plurality of deposit transactions;
create a deposit blockchain transaction for the second account in the second blockchain that includes the total sum amount; and
transmit the deposit blockchain transaction to one or more computing devices of the second plurality of computing devices for addition to the second blockchain.

2. The computing device of claim 1, wherein the instructions further cause the at least one processor to:
identify a first blockchain transaction for the second account within the second blockchain, the first blockchain transaction including at a transaction value;
create a second blockchain transaction for the first account in the first blockchain, the second blockchain transaction including at least the transaction value; and
add the second blockchain transaction to the first blockchain.

3. The computing device of claim 1, wherein the instructions further cause the at least one processor to:
identify an occurrence of a win event by a winning electronic gaming device from the first plurality of computing devices, the win event identifying a win of the first progressive jackpot by the winning electronic gaming device;
create a withdrawal blockchain transaction including at least a jackpot value; and transmit the withdrawal blockchain transaction to one or more nodes of the second plurality of computing devices for addition to the second blockchain.

4. The computing device of claim 1, wherein one or more of the first blockchain and the second blockchain further includes a smart contract configured to execute upon detection of a win notification blockchain transaction, wherein execution of the smart contract includes:
identifying an account ID associated with the first progressive jackpot;
determining a jackpot value of the first progressive jackpot based on the account ID; and
transmitting a message to a winning device identified within the win notification blockchain transaction authorizing payment of the jackpot value.

5. The computing device of claim 1, wherein the first progressive jackpot is a linked progressive jackpot, wherein one or more of the first blockchain and the second blockchain is configured to allow deposit transactions from one or more electronic gaming machines and disallow withdrawal transactions from blockchain participating nodes other than a controlling node associated with the one or more of the first blockchain and second blockchain.

6. The computing device of claim 1, wherein the computing device participates in a blockchain network that is a permissioned blockchain of private nodes participating in one or more of the first blockchain and the second blockchain, wherein the permissioned blockchain executes a consensus protocol not including a proof of work protocol.

7. The computing device of claim 1, wherein the first progressive jackpot is a stand-alone progressive (SAP) jackpot local to a first electronic gaming machine of the first plurality of computing devices, wherein the first blockchain is configured to disallow withdrawal transactions from electronic gaming devices in the first blockchain other than the computing device.

8. A computer-implemented method for providing a multi-tier blockchain network supporting progressive jackpots, the method comprising:
identifying, by a computing device participating in a first blockchain and a second blockchain, a plurality of deposit transactions for a first account within the first blockchain, the first blockchain supporting a first plurality of computing devices, the second blockchain supporting a second plurality of computing devices, a first progressive jackpot being supported by the first account defined within the first blockchain and a second account defined within the second blockchain;
determining a total sum amount of the plurality of deposit transactions;
creating a deposit blockchain transaction for the second account in the second blockchain that includes the total sum amount; and
transmitting, by the computing device, the deposit blockchain transaction to one or more computing devices of the second plurality of computing devices for addition to the second blockchain.

9. The method of claim 8, further comprising:
identifying a first blockchain transaction for the second account within the second blockchain, the first blockchain transaction including at a transaction value;
creating a second blockchain transaction for the first account in the first blockchain, the second blockchain transaction including at least the transaction value; and
adding the second blockchain transaction to the first blockchain.

10. The method of claim 8, further comprising:
identifying an occurrence of a win event by a winning electronic gaming device from the first plurality of computing devices, the win event identifying a win of the first progressive jackpot by the winning electronic gaming device;
creating a withdrawal blockchain transaction including at least a jackpot value; and
transmitting the withdrawal blockchain transaction to one or more nodes of the second plurality of computing devices for addition to the second blockchain.

11. The method of claim 8, wherein one or more of the first blockchain and the second blockchain further includes a smart contract configured to execute upon detection of a win notification blockchain transaction, wherein execution of the smart contract includes:
identifying an account ID associated with the first progressive jackpot;
determining a jackpot value of the first progressive jackpot based on the account ID; and
transmitting a message to a winning device identified within the win notification blockchain transaction authorizing payment of the jackpot value.

12. The method of claim 8, wherein the first progressive jackpot is a linked progressive jackpot, wherein one or more of the first blockchain and the second blockchain is configured to allow deposit transactions from one or more electronic gaming machines and disallow withdrawal transactions from blockchain participating nodes other than a controlling node associated with the one or more of the first blockchain and second blockchain.

13. The method of claim 8, wherein the computing device participates in a blockchain network that is a permissioned blockchain of private nodes participating in one or more of the first blockchain and the second blockchain, wherein the permissioned blockchain executes a consensus protocol not including a proof of work protocol.

14. The method of claim 8, wherein the first progressive jackpot is a stand-alone progressive (SAP) jackpot local to a first electronic gaming machine of the first plurality of computing devices, wherein the first blockchain is configured to disallow withdrawal transactions from electronic gaming devices in the first blockchain other than the computing device.

15. A non-transitory, computer-readable storage medium storing instructions that, when executed by at least one processor, are configured to cause the at least one processor to:
identify, by a computing device participating in a first blockchain and a second blockchain, a plurality of deposit transactions for a first account within the first blockchain, the first blockchain supporting a first plurality of computing devices, the second blockchain supporting a second plurality of computing devices, a first progressive jackpot being supported by the first account defined within the first blockchain and a second account defined within the second blockchain;
determine a total sum amount of the plurality of deposit transactions;
create a deposit blockchain transaction for the second account in the second blockchain that includes the total sum amount; and
transmit, by the computing device, the deposit blockchain transaction to one or more computing devices of the second plurality of computing devices for addition to the second blockchain.

16. The non-transitory, computer-readable storage medium of claim 15, wherein the instructions are further configured to cause the at least one processor to:
- identify a first blockchain transaction for the second account within the second blockchain, the first blockchain transaction including at a transaction value;
- create a second blockchain transaction for the first account in the first blockchain, the second blockchain transaction including at least the transaction value; and
- add the second blockchain transaction to the first blockchain.

17. The non-transitory, computer-readable storage medium of claim 15, wherein the instructions are further configured to cause the at least one processor to:
- identifying an occurrence of a win event by a winning electronic gaming device from the first plurality of computing devices, the win event identifying a win of the first progressive jackpot by the winning electronic gaming device;
- creating a withdrawal blockchain transaction including at least a jackpot value; and
- transmitting the withdrawal blockchain transaction to one or more nodes of the second plurality of computing devices for addition to the second blockchain.

18. The non-transitory, computer-readable storage medium of claim 15, wherein one or more of the first blockchain and the second blockchain further includes a smart contract configured to execute upon detection of a win notification blockchain transaction, wherein execution of the smart contract includes:
- identifying an account ID associated with the first progressive jackpot;
- determining a jackpot value of the first progressive jackpot based on the account ID; and
- transmitting a message to a winning device identified within the win notification blockchain transaction authorizing payment of the jackpot value.

19. The non-transitory, computer-readable storage medium of claim 15, wherein the first progressive jackpot is a linked progressive jackpot, wherein one or more of the first blockchain and the second blockchain is configured to allow deposit transactions from one or more electronic gaming machines and disallow withdrawal transactions from blockchain participating nodes other than a controlling node associated with the one or more of the first blockchain and second blockchain.

20. The non-transitory, computer-readable storage medium of claim 15, wherein the computing device participates in a blockchain network that is a permissioned blockchain of private nodes participating in one or more of the first blockchain and the second blockchain, wherein the permissioned blockchain executes a consensus protocol not including a proof of work protocol.

* * * * *